US005964579A

United States Patent [19]

Tang et al.

[11] Patent Number: 5,964,579

[45] Date of Patent: Oct. 12, 1999

[54] PRESTRESSED RESILIENT COMPRESSOR MOUNT APPARATUS

[75] Inventors: Punan Tang, Fort Smith; Diane M. Jakobs, Alma; Ronald J. Rasmussen, Greenwood, all of Ark.

[73] Assignee: Rheem Manufacturing Company, New York, N.Y.

[21] Appl. No.: 08/881,673

[22] Filed: Jun. 24, 1997

[51] Int. Cl.[6] .............................. F04B 17/00; F16L 5/00

[52] U.S. Cl. .............................. 417/363; 248/56

[58] Field of Search .............................. 417/363; D8/354; 248/56

[56] References Cited

U.S. PATENT DOCUMENTS

| | | | |
|---|---|---|---|
| D. 318,412 | 7/1991 | Williams | D8/356 |
| 2,466,952 | 4/1949 | Jakubowski | 218/25 |
| 2,468,286 | 4/1949 | Behlert | 218/25 |
| 2,551,514 | 5/1951 | Truelove et al. | 62/116 |
| 2,657,818 | 11/1953 | Mueller | 218/14 |
| 2,685,178 | 8/1954 | Eck | 62/115 |
| 2,759,255 | 8/1956 | Prince | 29/450 |
| 2,961,755 | 11/1960 | Prince | 29/235 |
| 3,350,767 | 11/1967 | Yannuzzi | 29/235 |
| 3,455,011 | 7/1969 | Harding | 29/235 |
| 3,785,167 | 1/1974 | Sahs | 62/296 |
| 4,089,496 | 5/1978 | Mizusawa | 248/56 |
| 4,132,194 | 1/1979 | Saito | 123/32 |
| 4,497,183 | 2/1985 | Gelbard et al. | 62/295 |
| 4,696,089 | 9/1987 | Gjesdal | 29/451 |
| 4,711,423 | 12/1987 | Popper | 248/635 |
| 4,782,573 | 11/1988 | LeFloch | 29/235 |
| 5,040,953 | 8/1991 | Tinsler | 417/363 |
| 5,090,115 | 2/1992 | Fuller et al. | 29/789 |
| 5,221,192 | 6/1993 | Heflin et al. | 417/363 |
| 5,277,554 | 1/1994 | Elson | 417/363 |
| 5,306,121 | 4/1994 | Heflin et al. | 417/363 |
| 5,313,806 | 5/1994 | Feng | 62/295 |

*Primary Examiner*—Charles G. Freay
*Assistant Examiner*—Paul L. Ratcliffe
*Attorney, Agent, or Firm*—Konneker & Smith, P.C.

[57] ABSTRACT

An elastomeric compressor mount has a hollow convex cylindrical head portion which is passed upwardly through a corresponding opening in a support foot portion of the compressor to place an annular portion of the foot in an annular mount groove which is disposed between its head portion and a larger cylindrical base portion of the mount. When a securement bolt is passed axially through a fastening opening in the mount and tightened into an underlying base pan opening, the convex mount head portion is downwardly and radially outwardly deformed to cause the annular foot portion to be resiliently squeezed between the head portion and the underlying base portion of the mount. In a second embodiment of the mount its convex cylindrical head portion is of a solid configuration, and is joined to the mount base portion by an annular flange section coaxially disposed therein. When the securement bolt is tightened the head portion is pushed downwardly relative to the mount body portion in a manner axially flexing the flange section and squeezing the annular compressor foot portion between the head and base sections of the mount. In a third embodiment of the mount its head section is cylindrical and has a depending, reduced diameter stem section which is telescoped within the underlying mount base section to permit relative axial movement between the head and base sections of the mount when the securement bolt is tightened.

24 Claims, 4 Drawing Sheets

2/4

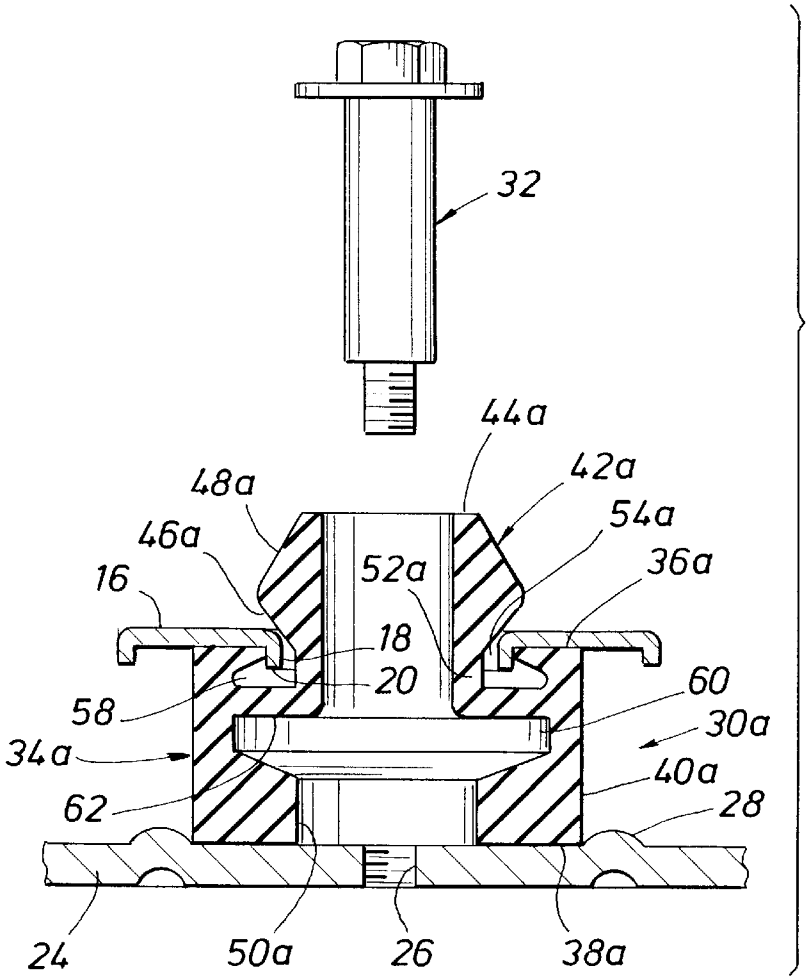
FIG. 7
FIG. 8
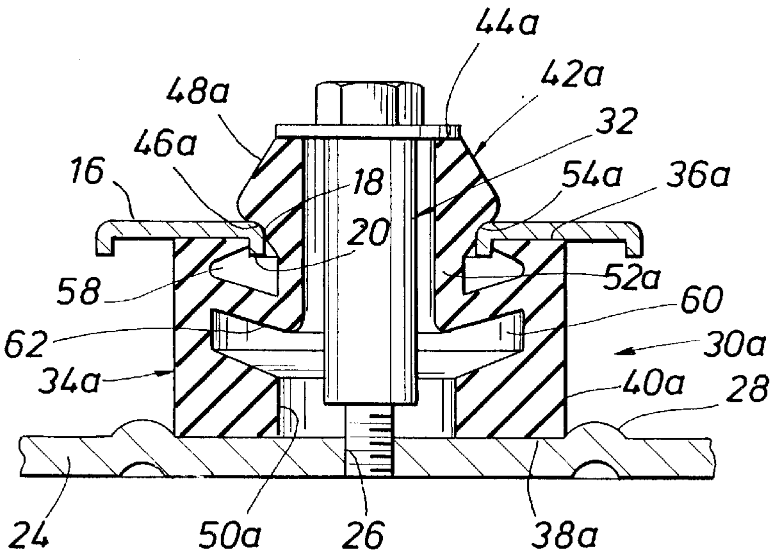

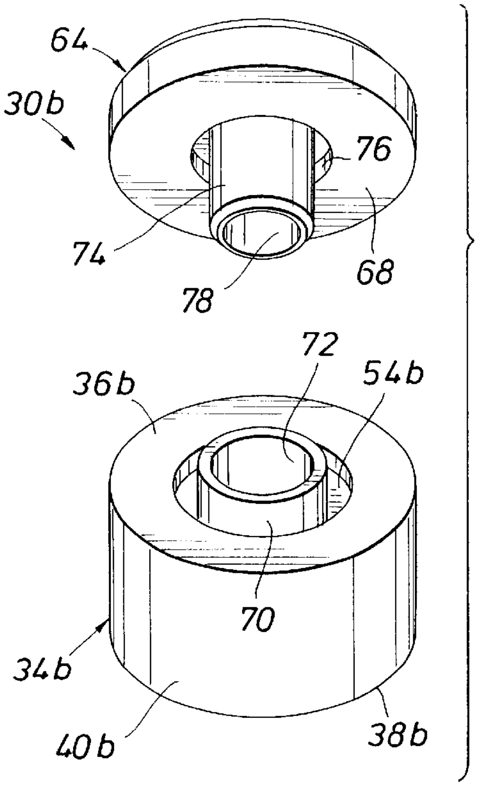
FIG. 9
FIG. 11
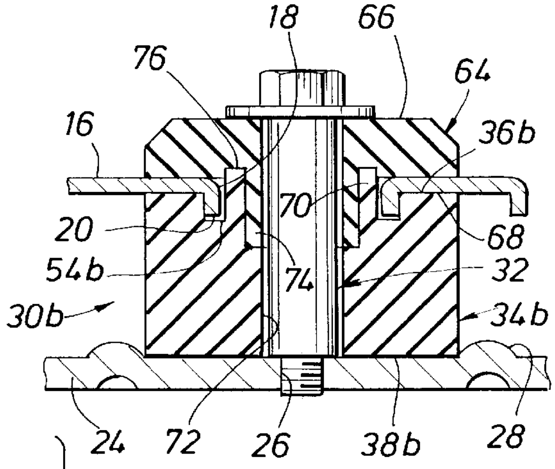
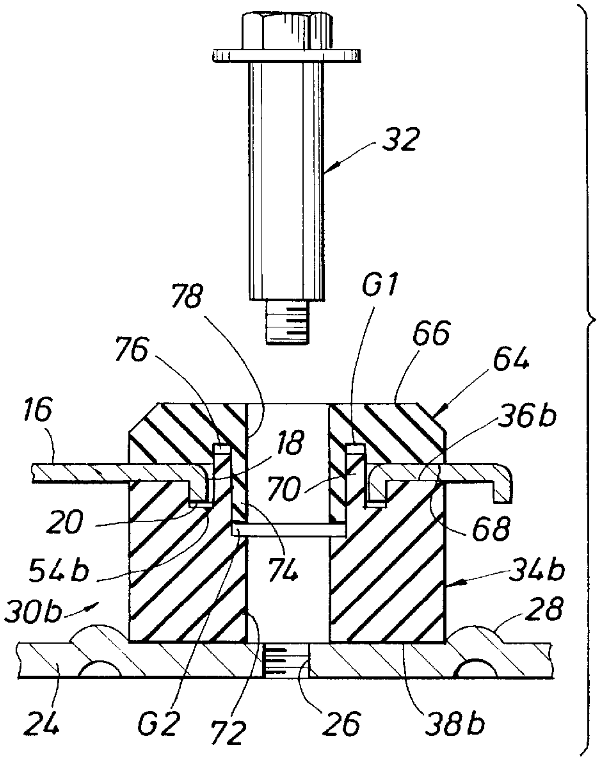
FIG. 10

PRESTRESSED RESILIENT COMPRESSOR MOUNT APPARATUS

BACKGROUND OF THE INVENTION

The present invention generally relates to apparatus for resiliently mounting vibration-prone machinery and, in a preferred embodiment thereof, more particularly relates to elastomeric mounting members used to provide vibration absorbing support for the mounting feet portions of a compressor.

Mechanical compressors used, for example, in air conditioning and heat pump systems typically generate a considerable amount of vibration during their operation. In an attempt to isolate the equipment to which the compressor is connected, small resilient devices typically referred to as compressor mounts are used and are operatively interposed between mounting feet portion of the compressor and a support structure, such as a base pan, which underlies the compressor.

In common with various other types of machinery, a mechanical compressor will vibrate and radiate sound when it is excited by an external dynamic force. The radiated sound pressure level is governed by two major factors—the excitation force magnitude and frequency characteristics and the compressor's dynamic characteristics. Accordingly, structural vibration can be reduced by either external dynamic force isolation, structural modification, or both. A structural modification of the compressor to diminish its vibration forces is typically quite complex, and thus undesirable, due to the multi-frequency and multi-directional excitation forces to which the compressor is normally subjected. Accordingly, due to their simplicity and cost effectiveness, elastomeric compressor mounts are widely employed to isolate the compressor's vibration energy from the support structure.

A compressor's natural rigid modes consist of the six degree of freedom motions (three translation motions, two rotating motions, and one torsional motion), but its internal excitations may be limited to only several directions which are dependent on the compressor type. An isolator can be designed to accommodate the forced excitation direction and frequency. For example, a vibration isolation mount designed to isolate translation excitation may not affect rotational excitation isolation, and may not attenuate the overall operation sound level of the compressor.

It is difficult to design a compressor mount to handle all vibration isolation applications because such design would require that the compressor mount and the piping attached to the compressor have a high degree of flexibility in all six directions. And, if this design was incorporated, the compressor assembly would be unstable, undesirably resulting in large deformations of the compressor assembly, damaged piping, stripped compressor bolts and the like. From a practical standpoint, a satisfactory compressor mount would have sound reduction capabilities in addition to having enough stiffness to maintain small startup tubing stress, system anti-shock capabilities and compressor assembly reliability.

A conventionally configured elastomeric compressor mount typically has a lower cylindrical base portion which rests on a base pan member, and a smaller diameter head portion projecting upwardly from the base portion, with an annular groove formed generally at the juncture of the base and head portions of the mount. A connection bolt through-hole extends axially through the mount. To support a compressor foot on a conventional elastomeric mount of this general type the mount base portion is placed on the top side of a base pan structure, the mount head portion is passed upwardly through a circular mounting hole in the compressor foot, and an annular bottom side flange on the compressor foot is forced into the annular groove in the mount. A mounting bolt is then extended downwardly through the mount through-hole and threaded into the underlying base pan structure to hold the mount and the associated compressor foot in place.

The mount head portion has a cylindrical upper end portion with a diameter larger than that of the compressor foot hole through which the cylindrical upper end portion of the mount head must be passed. Accordingly, when the compressor foot is operatively placed on the underlying mount base portion, the cylindrical upper end portion of the mount head horizontally overlaps an annular area of the compressor foot surrounding its mounting hole, thereby captively retaining the foot against upward removal thereof from the mount.

Two primary problems have typically been associated with conventional elastomeric compressor mounts of the type generally described above. First, their configurations tend to make them difficult to install on compressor mounting feet since a considerable amount of force is typically required to push the mount head portion upwardly through the mounting hole in the compressor foot. Second, because of their configurations it is often difficult to tighten the mounts onto their captively retained compressor feet in a manner suitably restraining the compressor feet against vertical movement relative to the mounts. This permits the compressor to undesirably "rock" on its underlying mounts in a manner transmitting a substantial amount of operational vibration load to the refrigerant tubing attached to the compressor, as well as to other portions of the air conditioning or heat pump system.

In some previously utilized mounts a vertical gap is intentionally provided between the top side of the installed compressor foot and the underside of the mount head portion to make it easier to place the annular underside flange of the compressor foot into the annular mount groove. While this makes the placement of the compressor feet on their associated elastomeric mounts easier, it also permits the mount-supported compressor even more freedom to rock on the mounts and potentially damage other portions of the overall air conditioning or heat pump system with which the compressor is associated.

From the foregoing it can readily be seen that a need exists for an improved elastomeric compressor mount design which eliminates or at least substantially reduces the above-mentioned problems associated with conventional elastomeric compressor mounts. It is accordingly an object of the present invention to provide such an elastomeric compressor mount design.

SUMMARY OF THE INVENTION

In carrying out principles of the present invention, in accordance with a preferred embodiment thereof, a specially designed resilient mount is provided for supporting and attenuating the operational vibration of a machine having a base member with an opening therein. Representatively, the mount is an elastomeric compressor mount for use with a compressor incorporated, for example, in an air conditioning or heat pump system, the compressor having a spaced plurality of mounting foot portions having openings therein. However, the principles of the present invention could be advantageously utilized to provide a resilient mount for other types of vibration prone machines in a variety of other applications.

From a broad perspective, the compressor mount extends along an axis and includes an upper portion extendable through a compressor foot opening; a lower portion restable on a support surface such as the top side of a base pan; and an intermediate portion interconnecting the upper and lower portions. A tightening opening extends axially through the upper, lower and intermediate portions and is configured to receive a tightening member, such as a mounting bolt threaded into the base pan, which is operative to axially compress the elastomeric mount.

According to a key feature of the invention, the compressor mount is configured to permit the upper mount portion to be moved toward the lower portion, to thereby resiliently squeeze a portion of the associated compressor mounting foot between the upper and lower mount portions, without substantially compressing the intermediate portion of the mount. The special configuration of the mount functions facilitate the placement of the compressor foot thereon and to axially weaken the mount in a manner assuring that the compressor foot is resiliently squeezed between the upper and lower portions of the mount in a manner adding axial and horizontal stiffness to the compressor and mount system and providing a substantially linear elastic damping system which enhances the stability of the overall apparatus and resiliently inhibiting rocking of the mount-supported compressor about horizontal axes.

In a first embodiment of the elastomeric compressor mount, the mount is a one piece elastomeric molding, with the upper mount portion being upwardly extendable through the compressor foot opening and having a hollow convex cylindrical configuration and a substantially uniform wall thickness. Preferably, the upper portion has an upper end having a diameter less than that of the compressor foot opening, and a maximum diameter approximately 1.5 times that of the compressor foot opening. The shape of the upper mount portion, and its uniform wall thickness, permits it to be laterally deformed to facilitate its upward insertion movement through the mounting foot hole, and also permits it to be outwardly deformed in a lateral direction, when the mounting bolt extending axially through the mount is tightened, to resiliently squeeze the mounting foot between the upper and lower portions of the mount.

Representatively, the mount also has an annular groove which is formed in the upper end of the lower mount portion and outwardly circumscribes the intermediate mount portion. The groove is sized to receive a corresponding depending annular flange portion of the compressor mounting foot. Preferably, the lower portion of the mount has a series of openings extending upwardly through its bottom end and being circumferentially spaced apart around the axially extending tightening opening in the mount. These openings facilitate the molding of the mount by generally equalizing the wall thicknesses in the lower portion of the mount.

In a second embodiment of the elastomeric compressor mount, also of a one piece molded construction, the lower portion of the mount has a flexible interior annular flange that circumscribes the mount axis. Preferably, the lower portion has first and second annular interior recesses therein which circumscribe the mount axis and are respectively positioned adjacent top and bottom sides of the internal flange. The intermediate portion of the mount interconnects central sections of the upper mount portion and the internal flange in the lower mount portion. With the upper mount portion in place within the compressor foot opening, the tightening of the axially extending mounting bolt forces the upper mount portion downwardly toward the lower mount portion, thereby downwardly deflecting the internal lower mount portion flange and resiliently squeezing the compressor foot between the upper and lower mount portions.

Preferably, the upper mount portion has a convex cylindrical configuration, and an annular groove is formed in the upper end of the lower mount portion to receive the depending annular flange on the compressor foot.

In a third embodiment of the elastomeric compressor mount the mount is of a two piece molded construction with the upper mount portion being separate from the lower mount portion. The upper and lower mount portions have central, outwardly projecting sections which are slidably telescopable with one another, the telescoped sections defining an intermediate, axially extending portion of the mount which is extendable through the compressor foot opening, interconnects the upper and lower mount portions, and permits them to be axially moved toward one another.

When the axially extending mounting bolt is tightened, the upper mount portion is moved toward the lower mount portion to resiliently squeeze the compressor mounting foot between the upper and lower mount portions. Preferably, an annular groove is formed in the top end of the lower mount portion to receive the depending annular compressor foot flange.

BRIEF DESCRIPTION OF THE DRAWINGS

FIGS. 7 and 8 are partially elevational cross-sectional views through a first alternate embodiment of the compressor mount and sequentially illustrate its operative interconnection between a compressor foot and the base pan structure;

FIG. 9 is an exploded perspective view of a two-piece second alternative embodiment of the compressor mount; and FIGS. 10 and 11 are partially elevational cross-sectional views through the two-piece compressor mount and sequentially illustrate its operative interconnection between a compressor foot and the base pan structure.

DETAILED DESCRIPTION

Figure 1:
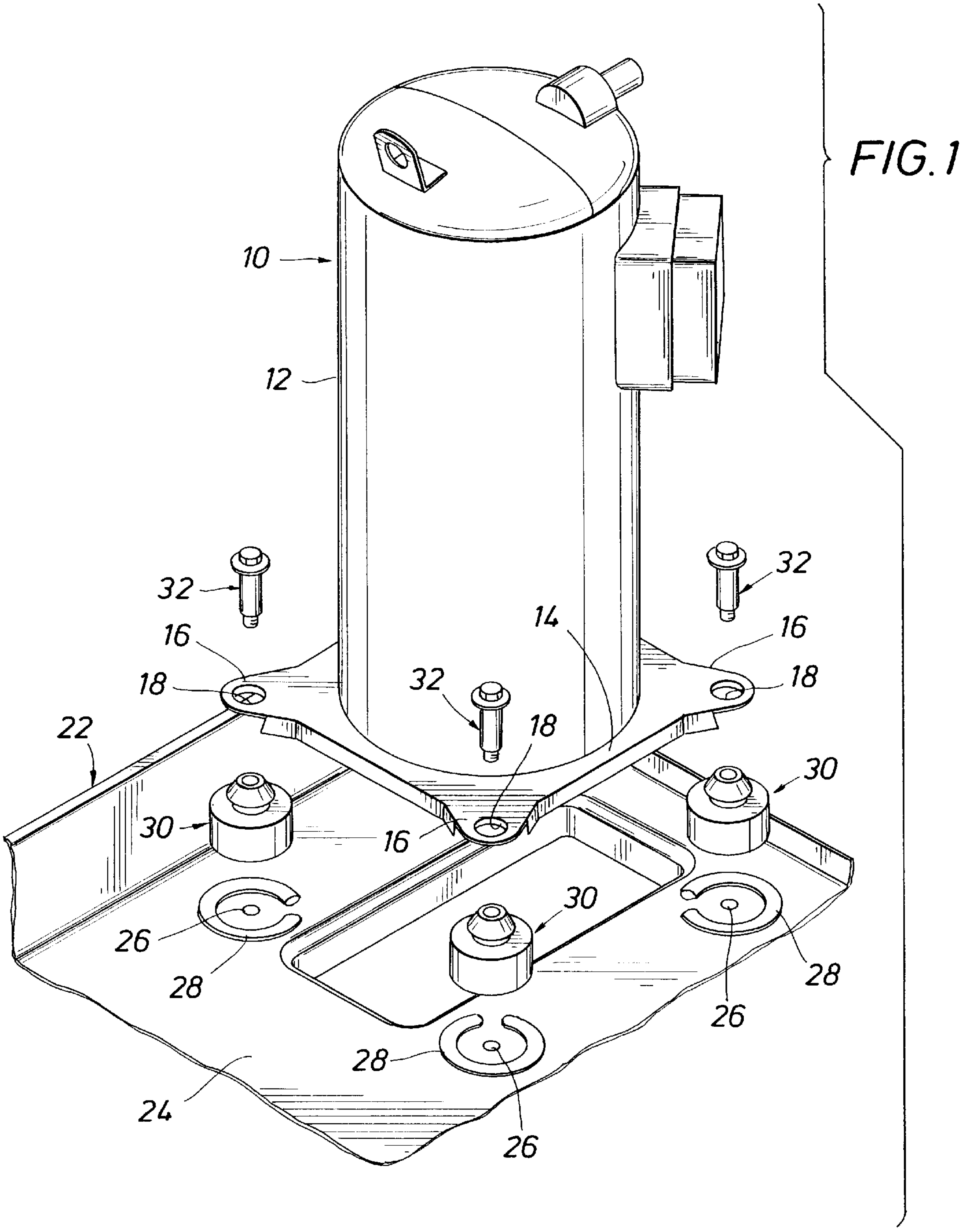
FIG. 1 is an exploded perspective view of a representative air conditioning or heat pump system compressor which is operatively mounted on a base pan structure using specially designed resilient compressor mounts embodying principles of the present invention.

Perspectively illustrated in exploded form in FIG. 1 is a representative mechanical compressor 10 used in, for example, an air conditioning or heat pump system and being operatively connected to associated refrigerant tubing (not shown) in a conventional manner. Compressor 10 has a vertically oriented cylindrical body portion 12 at the bottom of which a generally rectangular support structure 14 is secured. The support structure 14 has, at each of its four corners, an outwardly projecting foot portion 16 (only three of the compressor feet being visible in FIG. 1) having a circular opening 18 formed therein. Each opening 18 is circumscribed by an annular flange 20 (see FIG. 5) depending from the bottom side of the foot 16. A base pan structure 22 having a bottom wall 24 underlies the compressor 10, the bottom wall 24 having four mounting holes 26 which are horizontally alignable with the compressor foot openings 18 and are outwardly ringed by arcuate guide embossments 28 formed on the top side of the bottom base pan wall 24.

Compressor 10 is resiliently supported atop the bottom base pan wall 24 by four specially designed vibration attenuating resilient compressor mounts 30 (only three of which are visible in FIG. 1) which embody principles of the present invention and are interposed between the compressor feet 16 and the bottom base pan wall 24, and secured thereto by vertical bolts 32, in a manner subsequently described herein. Preferably, the mounts 30 are molded as one piece structures from a suitable elastomeric material.

Figure 2:
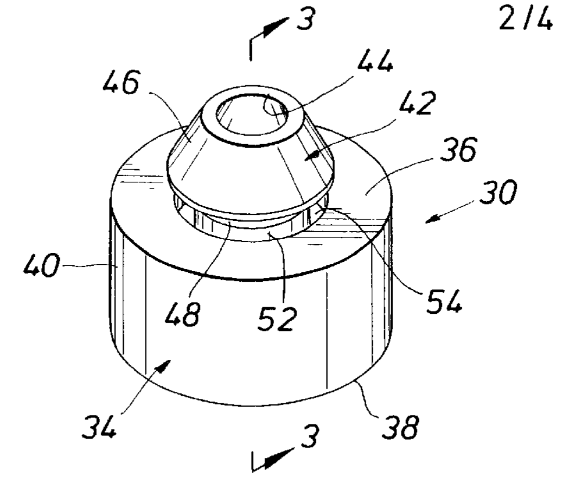
FIG. 2 is an enlarged scale perspective view of one of the compressor mounts.
Figure 3:
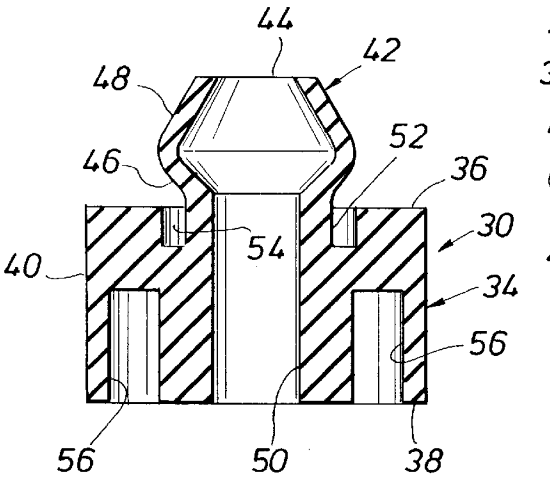
FIG. 3 is an enlarged scale cross-sectional view through the compressor mount taken along line 3—3 of FIG. 2.
Figure 4:
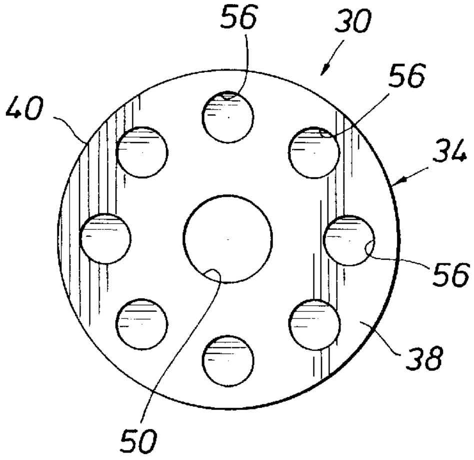
FIG. 4 is an enlarged scale bottom plan view of the compressor mount.

Turning now to FIGS. 2–4, each mount 30 has a cylindrical lower base portion 34 with an annular top end 36, an annular bottom end 38, and an annular vertical outer side 40. Projecting axially upwardly beyond the top end wall 36 is a hollow convex cylindrical head portion 42 of the mount 30 which has an open upper end 44, an upwardly and radially outwardly sloped bottom side wall 46, and an upwardly and radially inwardly sloped top side wall 48. An axially extending circularly cross-sectioned tightening opening 50 passes upwardly through the bottom base portion end 38 into the head portion interior which forms a laterally enlarged upward extension of the tightening opening.

The mount head portion 42 has a substantially uniform wall thickness, and is joined at its bottom end to the top end of the mount base portion 34 by an annular intermediate section 52 of the mount which is outwardly circumscribed by an annular groove 54 formed in the top base portion end wall 36 and underlying the sloping bottom side wall 46 of the mount head portion 42. Preferably, the diameter of the convex cylindrical mount head portion 42 at its upper end is less than the diameter of each support foot opening 18, while the maximum diameter of the head portion 42 is approximately 1.5 times the support foot opening diameter.

As best illustrated in FIGS. 3 and 4, a circumferentially spaced series of circularly cross-sectioned holes 56 surround the tightening hole 50 and extend upwardly through the bottom end 38 of the mount base portion 34. These holes serve to facilitate the mount molding process by maintaining a generally uniform elastomeric material thickness in the base 34, thereby maintaining a generally uniform thermal stress during molding, and additionally reducing the material cost of the mount.

Figure 5:
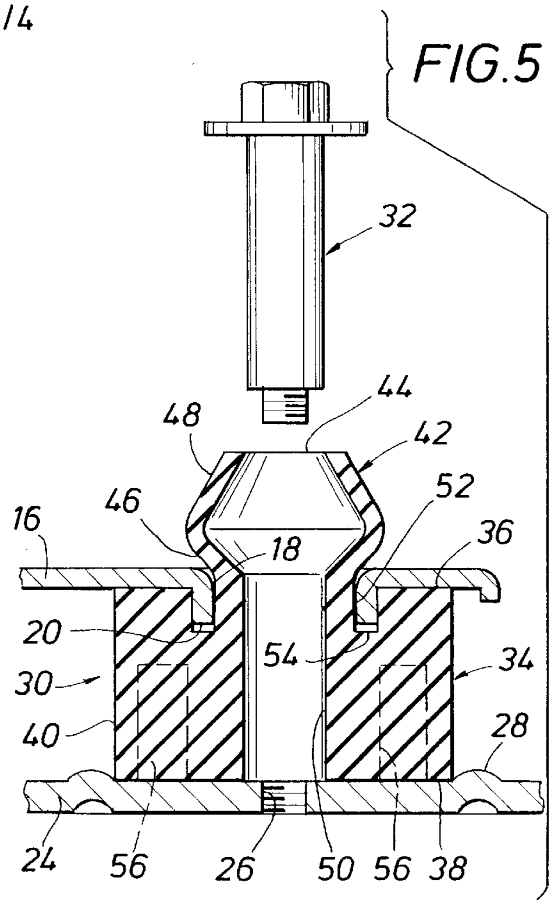
FIGS. 5 and 6 are enlarged scale partially elevational cross-sectional views of the compressor mount sequentially illustrating its operative interconnection between a compressor foot and the base pan structure.

Each compressor foot 16 is operatively installed on the bottom base pan wall 24, in an upwardly spaced relationship therewith, using one of the vibration attenuating elastomeric mounts 30 in a manner which will now be described in conjunction with FIGS. 5 and 6. The hollow, convex cylindrical head portion 42 of each mount 30 is laterally deformed and then passed upwardly through its associated foot opening 18 in a manner causing the bottom side of the foot 16 to downwardly engage the top end 36 of the mount base portion, and the depending annular flange portion 20 of the foot to enter the annular mount groove 54. The laterally deformed head portion 42 is then allowed to spring back to its original shape, as shown in FIG. 5, in which the radially enlarged axially central portion of the head 42 outwardly overlies a corresponding annular portion of the compressor foot 16.

Figure 6:
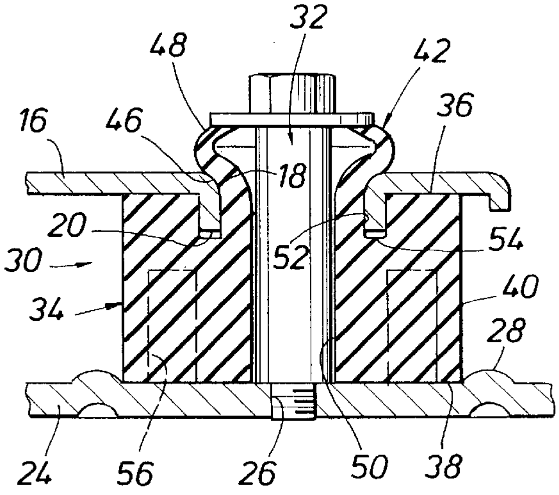

The bottom end 38 of each mount 30 is placed on the top side of the bottom base pan wall 24, within one of the arcuate embossments 28 thereon, and one of the bolts 32 is axially extended downwardly through the mount 30 and threaded into the underlying base pan mounting hole 26 as illustrated in FIG. 6. The cylindrical body portion of each bolt 32 is shorter than the total undeformed height of its associated elastomeric mount. Thus, when the bolt is tightened into the base pan wall 24 the enlarged head portion of the bolt moves the hollow convex cylindrical mount head portion 42 toward the upper end 36 of the mount base portion 34 by axially compressing the head portion 42, while at the same time radially outwardly deforming it. This, in turn, resiliently squeezes an annular portion of the compressor foot 16 outwardly adjacent the foot opening 18 between the bottom side surface 46 of the deformed mount head portion 42 and the top end 36 of the mount base portion 34 as shown in FIG. 6.

The unique configuration of each elastomeric compressor mount 30 provides it with several advantages over conventionally configured mounts used in this particular application. For example, the mount 30 is considerably easier to install on its associated compressor foot 16 due to the hollow, thin-walled head portion 42 of the mount which may be easily compressed in a lateral (i.e., horizontal) direction to facilitate its upward passage through the mounting hole 18 in the foot 16. Additionally, the upward and radially outward slope of the bottom side wall 46 of the mount head portion 42 provides an enlarged entrance area for the underlying annular groove 54 to make it easier to insert the depending compressor foot flange 20 into the groove.

Moreover, the provision of the hollow convex cylindrical head portion 42 on the mount 30 axially weakens it in a manner permitting the head portion 42 to be moved downwardly toward the mount base portion 34 (as may be seen by comparing FIGS. 5 and 6), to resiliently squeeze an annular portion of the installed compressor foot 16 between the bottom side wall 46 of the mount 30 and the upper end 36 of the mount base portion 34, without creating a substantial compressive force in the annular intermediate section 52 of the mount. With the mount head portion 42 laterally deformed and pressed down onto the compressor foot 16 in this manner, the mount 30 adds axial and horizontal stiffness to the compressor and mount system and provides a substantially linear elastic damping system which enhances the stability of the overall apparatus and resiliently inhibits rocking of the compressor 10 about horizontal axes.

A first alternate embodiment 30*a* of the previously described elastomeric compressor mount 30 is cross-sectionally illustrated in FIGS. 7 and 8. For ease in comparison, features and components in the mount 30*a* similar to those in the mount 30 have been given identical reference numerals having the subscript "a".

The elastomeric mount 30*a* has a cylindrical lower base portion 34*a* with an annular top end 36*a*, an annular bottom end 38*a*, and an annular vertical outer side 40*a*. Projecting axially upwardly beyond the top end wall 36*a* is a hollow convex cylindrical head portion 42*a* of the mount 30*a* which has an open upper end 44*a*, an upwardly and radially outwardly sloped bottom side wall 46*a*, and an upwardly and radially inwardly sloped top side wall 48*a*. An axially extending circularly cross-sectioned tightening opening 50*a* passes upwardly through the bottom base portion end 38*a* into the head portion interior which forms a radially reduced, circularly cross-sectioned upward extension of the tightening opening 50*a*. Unlike the previously described mount head portion 42, the head portion 42*a* has a nonuniform wall thickness as cross-sectionally illustrated in FIGS. 7 and 8.

An enlarged diameter annular groove 58 is interiorly formed within the mount base portion 34*a* and forms a downward continuation of the smaller diameter annular groove 54*a* at the top end of the base portion 34*a*. A vertically thicker annular groove 60 is formed in the interior side surface of the mount base portion 34*a* and is spaced downwardly apart from the annular groove 58. Positioned between the annular grooves 58 and 60 within the mount base portion 34*a* is an annular internal flange portion 62 of the mount 30*a*. As illustrated in FIGS. 7 and 8 the annular intermediate mount section 52*a*, to which the head portion 42*a* is attached, extends upwardly from a central annular portion of the internal flange 62.

To install the mount 30*a*, its convex cylindrical head portion 42*a* is laterally deformed and passed upwardly through the hole 18 in the compressor foot 16 and then allowed to snap back to its original undeformed configuration, and the bottom end 38*a* of the mount base portion 34*a* is placed on the base pan wall 24, within the arcuate embossment 28, as shown in FIG. 7. Next, as indicated in FIG. 8, the bolt 32 is extended downwardly through the tightening opening 50*a* in the mount 30*a* and threaded into the base pan opening 26. This forces the mount head portion 34*a* downwardly toward the upper end 36*a* of mount base portion 34*a*, thereby downwardly deflecting the annular internal flange 62 and resiliently squeezing an annular portion of the compressor foot 16 circumscribing its mounting opening 18 between the bottom side 46*a* of the mount head portion 42*a* and the top end 36*a* of the mount base portion 34*a* as cross-sectionally illustrated in FIG. 8.

The connection of the intermediate mount section 52*a* to the resiliently and downwardly deflectable annular internal flange 62 thus axially weakens the mount 30*a* in a manner permitting the annular compressor foot portion to be resiliently squeezed between the mount base and head portions 34*a*,42*a* without imposing a substantial amount of compressive force on the annular intermediate section 52*a* of the mount 30*a*.

A second alternate embodiment 30*b* of the previously described elastomeric compressor mount 30 is cross-sectionally illustrated in FIGS. 7 and 8. For ease in comparison, features and components in the mount 30*b* similar to those in the mount 30 have been given identical reference numerals having the subscript "b".

The mount 30*b* is of a two piece construction and has a cylindrical lower base portion 34*b* with an annular top end 36*b*, an annular bottom end 38*b*, and an annular vertical outer side 40*b*, and a generally cylindrical head portion 64 with an annular top side 66 and an annular bottom side 68. Projecting upwardly beyond the top side 36*b* of the base portion 34*b* is an annular central section 70 which is outwardly circumscribed by the annular groove 54*b* in the top end 36*b* of the base portion 34*b*. A central, circularly cross-sectioned opening 72 axially extends between the bottom base portion end 38*b* and the upper end of the central section 70.

An annular central section 74 of the head portion 64 projects downwardly beyond the bottom side 68 and is outwardly circumscribed by an annular groove 76 formed in the bottom side 68 of the head portion 64. A central, circularly cross-sectioned opening 78 axially extends between the top side 66 of the head portion 64 and the lower end of the central section 74. The central section 74 of the head portion 64 is slidingly and telescopingly receivable in the interior of the central section 70 of the base portion 34*b*, and an upper end portion of the central section 70 of the base portion 34*b* is slidingly and telescopingly receivable in the annular groove 76 in the head portion 64.

To install the mount 30*b* the lower end 38*b* of the base portion 34*b* is placed on the top side of the base pan wall 24, within the arcuate top side embossment 28, and the compressor foot 16 is placed on the top end 36*b* of the base portion 34*b* in a manner such that the annular compressor foot flange 20 downwardly enters the annular groove 54*b* and the central base portion section 70 extends upwardly through the hole 18 in the compressor foot 16. Next, the head portion 64 is fitted onto the base portion 34*b* by pressing the head portion central section 74 downwardly into the interior of the base portion central section 70 which, in turn, causes an upper end of the base portion central section 70 to telescopingly enter the head portion groove 76, and the bottom side 68 of the head portion 64 to engage the top side of the compressor foot 16.

At this point, as shown in FIG. 10, an annular gap G1 is present in the head portion annular groove 76 above the upper end of the base portion central section 70, and an annular gap G2 is present in the base portion annular groove 54*b* beneath the lower end of the head portion central section 74. The central base and head portion openings 72 and 78 combinatively form an axial tightening opening in the mount 30*b* for the bolt 32, and the telescoped central sections 70,74 combinatively form an intermediate section of the mount 30*b* which joins its base and head portions 38*b* and 64.

With the mount 30*b* in its FIG. 10 orientation, the bolt 32 is passed downwardly through the tightening opening 72,78 of the mount 30*b* and threaded into the base pan opening 26 as shown in FIG. 11. This moves the head portion 64 downwardly toward the base portion 34*b*, slides the central head portion section 74 downwardly along the central base portion section 72 in a manner substantially eliminating the gaps G1 and G2, and resiliently squeezes an annular portion of the compressor foot 16 surrounding its mounting hole 18 between the bottom side 68 of the head portion 64 and the top side 36*b* of the base portion 34*b*.

In common with the intermediate sections of the previously described elastomeric mounts 30 and 30*a*, the telescoped intermediate section 70,74 of the mount 30*b* serves to axially weaken the mount 30*b* in a manner such that, upon tightening of the bolt 32 as shown in FIG. 11, the head portion 64 is moved toward the base portion 34*b* without imposing any substantial compressive force on the intermediate mount section 70,74. Also like the previously described mounts 30 and 30*a*, the elastomeric mount 30*b* adds axial and horizontal stiffness to the compressor and mount system and provides a substantially linear elastic damping system which enhances the stability of the overall apparatus and resiliently inhibits rocking of the compressor 10 about horizontal axes. Additionally, due to its unique two-piece construction, each mount 30*b* is particularly easy to operatively install on its associated compressor foot 16.

While the elastomeric mounts 30,30*a* and 30*b* have been illustrated as being representatively installed on a compressor in an air conditioning or heat pump system, it will be readily appreciated by those of skill in this particular art that they could also be advantageously utilized in conjunction with many other types of vibration-prone machinery in other types of mechanical systems.

The foregoing detailed description is to be clearly understood as being given by way of illustration and example only, the spirit and scope of the present invention being limited solely by the appended claims.

What is claimed is:

1. A resilient mount for supporting and attenuating the operational vibration of a machine having a base member with an opening therein, said resilient mount extending along an axis and comprising:

an upper portion extendable through the base member opening, said upper portion having a hollow, convex cylindrical configuration and a substantially uniform wall thickness;

a lower portion restable on a support surface and coaxial with said upper portion;

an intermediate portion interconnecting said upper and lower portions; and a tightening opening, extending axially through said upper, lower and intermediate portions, for receiving a tightening member operative to axially compress said resilient mount, said resilient mount being configured to permit said upper portion to be moved toward said lower portion, to thereby resiliently squeeze a portion of the machine base member between said upper and lower portions, without substantially compressing said intermediate portion of said resilient mount.

2. The resilient mount of claim 1 further comprising an annular recess, positioned between said upper and lower portions and circumscribing said intermediate portion, for receiving a corresponding annular portion of the machine base member circumscribing the opening therein.

3. The resilient mount of claim 1 wherein said resilient mount is a compressor mount.

4. The resilient mount of claim 3 wherein said compressor mount is formed from an elastomeric material.

5. The resilient mount of claim 4 further comprising an annular recess, positioned between said upper and lower portions and circumscribing said intermediate portion, for receiving an annular flange portion of a compressor mounting foot operatively secured to said compressor mount.

6. The resilient mount of claim 1 wherein said resilient mount is of a one piece molded construction.

7. A resilient mount for supporting and attenuating the operational vibration of a machine having a base member with an opening therein, said resilient mount extending alone an axis and comprising:

an upper portion extendable through the base member opening;

a lower portion restable on a support surface and coaxial with said upper portion;

an intermediate portion interconnecting said upper and lower portions; and a tightening opening, extending axially through said upper, lower and intermediate portions, for receiving a tightening member operative to axially compress said resilient mount, said resilient mount being configured to permit said upper portion to be moved toward said lower portion, to thereby resiliently squeeze a portion of the machine base member between said upper and lower portions, without substantially compressing said intermediate portion of said resilient mount, said lower portion having a flexible interior annular flange having an axial thickness substantially less than the axial thickness of said upper portion, and said intermediate portion extending upwardly from a central annular portion of said flange and connecting said upper portion thereto, said flexible interior annular flange being downwardly deflectable by said intermediate portion, in response to resiliently squeezing a portion of the machine base member between said upper and lower portions, in a manner substantially preventing axial compression of said intermediate portion.

8. The resilient mount of claim 7 wherein said lower portion has first and second annular interior recesses therein which circumscribe said axis and are respectively positioned adjacent top and bottom sides of said flange.

9. A resilient mount for supporting and attenuating the operational vibration of a machine having a base member with an opening therein, said resilient mount extending along an axis and comprising:

an upper portion extendable through the base member opening;

a lower portion restable on a support surface and coaxial with said upper portion;

an intermediate portion interconnecting said upper and lower portions; and a tightening opening, extending axially through said upper, lower and intermediate portions, for receiving a tightening member operative to axially compress said resilient mount, said resilient mount being configured to permit said upper portion to be moved toward said lower portion, to thereby resiliently squeeze a portion of the machine base member between said upper and lower portions, without substantially compressing said intermediate portion of said resilient mount, said resilient mount being of a two piece construction, said upper portion being separate from said lower portion, and said intermediate portion being defined by first and second hollow tubular projections respectively formed on said upper and lower portions and telescopingly and slidingly engageable with one another, said first and second hollow tubular projections being axially movable relative to one another, in response to the resilient squeezing of a portion of the machine base member between said upper and lower portions, to thereby prevent the creation of a substantial axial stress in said intermediate portion.

10. A resilient mount for supporting and attenuating the operational vibration of a machine having a base member with an opening therein, said resilient mount extending along an axis and comprising:

an upper portion extendable through the base member opening;

a lower portion restable on a support surface and coaxial with said upper portion;

an intermediate portion interconnecting said upper and lower portions; and a tightening opening, extending axially through said upper, lower and intermediate portions, for receiving a tightening member operative to axially compress said resilient mount, said resilient mount being configured to permit said upper portion to be moved toward said lower portion, to thereby resiliently squeeze a portion of the machine base member between said upper and lower portions, without substantially compressing said intermediate portion of said resilient mount, said lower portion having a bottom end and a series of openings extending upwardly through said bottom end and being circumferentially spaced around said tightening opening.

11. An elastomeric compressor mount for supporting and attenuating the operational vibration of a compressor having a mounting foot portion with a circular opening therein, said compressor mount extending along an axis and comprising:

an upper portion upwardly extendable through the compressor foot opening, said upper portion having a hollow configuration, a substantially uniform wall thickness, and a downwardly and radially inwardly sloping annular bottom side;

a lower portion restable on a support surface and spaced apart along said axis from said upper portion;

an intermediate portion interconnecting said upper and lower portions; and a tightening opening, extending axially through said upper, lower and intermediate portions, for receiving a tightening member operative to axially compress said resilient mount in a manner resiliently squeezing an annular portion of the compressor foot between said upper and lower portions of said compressor mount.

12. The elastomeric compressor mount of claim 11 wherein said upper portion has a convex cylindrical configuration.

13. The elastomeric compressor mount of claim 12 wherein said upper portion has an upper end with a diameter less than that of the compressor foot opening.

14. The elastomeric compressor mount of claim 13 wherein said upper portion has a maximum diameter approximately 1.5 times that of the compressor foot opening.

15. The elastomeric compressor mount of claim 11 wherein said lower portion has a bottom end and a series of openings extending upwardly through said bottom end and being circumferentially spaced around said tightening opening.

16. The elastomeric compressor mount of claim 11 wherein said compressor mount is of a one piece molded construction.

17. The elastomeric compressor mount of claim 11 further comprising an annular groove formed in the upper end of said upper portion and outwardly circumscribing said intermediate portion.

18. An elastomeric compressor mount for supporting and attenuating the operational vibration of a compressor having a mounting foot portion with a circular opening therein, said compressor mount extending along an axis and comprising:

an upper portion upwardly extendable through the compressor foot opening;

a lower portion restable on a support surface and coaxial with said upper portion, said lower portion having a flexible interior annular flange circumscribing said axis and having an axial thickness substantially less than the axial thickness of said upper portion;

an intermediate portion interconnecting central sections of said upper portion and said internal flange; and a tightening opening, extending axially through said upper, lower and intermediate portions, for receiving a tightening member operative to axially compress said compressor mount in a manner resiliently squeezing a portion of the compressor foot between said upper and lower portions by moving said upper portion toward said lower portion and downwardly deflecting said internal flange, the downward deflection of said internal flange serving to substantially prevent the axial compression of said intermediate portion.

19. The elastomeric compressor mount of claim 18 wherein said upper portion has a convex cylindrical configuration.

20. The elastomeric compressor mount of claim 18 wherein said lower portion has first and second annular interior recesses therein which circumscribe said axis and are respectively positioned adjacent top and bottom sides of said flange.

21. The elastomeric compressor mount of claim 18 wherein said compressor mount is of a one piece molded construction.

22. The elastomeric compressor mount of claim 18 further comprising an annular groove formed in the upper end of said lower portion and outwardly circumscribing said intermediate portion.

23. A two piece elastomeric compressor mount for supporting and attenuating the operational vibration of a compressor having a mounting foot portion with a circular opening therein, said compressor mount being positionable to extend along an axis and comprising:

an upper portion extendable through the compressor foot opening;

a lower portion positionable below said upper portion, in a spaced relationship therewith along said axis, and restable on a support surface, said lower portion being separate from said upper portion, said upper and lower portions having central, outwardly projecting sections which are slidably telescopable with one another, the telescoped sections defining an intermediate, axially extending portion of said mount which interconnects said upper and lower portions and permits them to be axially moved toward one another; and a tightening opening, extending axially through said upper and lower portions when they are slidingly telescoped with one another, for receiving a tightening member operative to axially compress said compressor mount in a manner moving said upper portion toward said lower portion to resiliently squeeze a portion of the compressor foot between said upper and lower portions of said compressor mount and responsively create relative axial movement between said telescoped sections in a manner thereby preventing the creation of substantial axial stress in said intermediate portion of said mount when the compressor foot is resiliently squeezed between said upper and lower portions of said compressor mount.

24. The two piece elastomeric compressor mount of claim 23 further comprising an annular recess formed in an upper end of said upper portion and configured to receive a corresponding annular depending flange portion of the compressor foot.

* * * * *

UNITED STATES PATENT AND TRADEMARK OFFICE
CERTIFICATE OF CORRECTION

PATENT NO. : 5,964,579

DATED : October 12, 1999

INVENTOR(S) : Tang et al.

It is certified that error appears in the above-indentified patent and that said Letters Patent is hereby corrected as shown below:

In Claim 24, line 3, delete "upper" and insert --lower-- in place thereof.

Signed and Sealed this

Seventeenth Day of April, 2001

Attest:

Nicholas P. Godici

NICHOLAS P. GODICI

*Attesting Officer*

*Acting Director of the United States Patent and Trademark Office*